US007892096B2

(12) United States Patent
Rigsby et al.

(10) Patent No.: US 7,892,096 B2
(45) Date of Patent: Feb. 22, 2011

(54) GAMING MACHINE WITH CONFIGURABLE BUTTON PANEL

(75) Inventors: Gene Rigsby, Chicago, IL (US); James M. Rasmussen, Chicago, IL (US)

(73) Assignee: WMS Gaming Inc., Waukegan, IL (US)

(*) Notice: Subject to any disclaimer, the term of this patent is extended or adjusted under 35 U.S.C. 154(b) by 922 days.

(21) Appl. No.: 11/359,738

(22) Filed: Feb. 22, 2006

(65) Prior Publication Data

US 2006/0189387 A1 Aug. 24, 2006

Related U.S. Application Data

(60) Provisional application No. 60/655,588, filed on Feb. 22, 2005.

(51) Int. Cl.
*G06F 17/00* (2006.01)

(52) U.S. Cl. ............................ 463/37; 463/16; 463/30; 273/138.1; 273/138.2; 273/148 B; 200/5 D; 200/276.1; 200/296; 200/314; 345/173; 74/473.3; 74/483 PB

(58) Field of Classification Search ............ 463/16–21, 463/30, 36–37, 42, 46; 273/85, 138, 138.1, 273/138.2, 138 A, 139, 143 R, 148, 237, 273/269, 148 B; 200/5 D, 5 E, 43.18, 50.36, 200/295–296, 276.1, 314, 341, 345, 412, 200/417, 422, 510, 520, 530; 345/156, 173–174, 345/178–180; 73/1.19, 1.23, 1.56; 40/315, 40/464; 74/473.3, 483 PB; *G06F 17/00*
See application file for complete search history.

(56) References Cited

U.S. PATENT DOCUMENTS

| | | | | | |
|---|---|---|---|---|---|
| 4,092,527 | A | * | 5/1978 | Luecke | 708/140 |
| 4,560,844 | A | * | 12/1985 | Takamura et al. | 200/5 A |
| 4,680,429 | A | * | 7/1987 | Murdock et al. | 178/20.02 |
| 4,977,298 | A | * | 12/1990 | Fujiyama | 200/5 A |
| 5,033,744 | A | | 7/1991 | Bridgeman et al. | 463/13 |
| 5,342,047 | A | | 8/1994 | Heidel et al. | 273/85 |
| 5,499,041 | A | * | 3/1996 | Brandenburg et al. | 345/174 |
| 5,632,679 | A | | 5/1997 | Tremmel | 463/36 |
| 5,742,894 | A | * | 4/1998 | Jambhekar et al. | 455/575.3 |
| 5,769,716 | A | | 6/1998 | Saffari et al. | 463/20 |

(Continued)

FOREIGN PATENT DOCUMENTS

EP 0769679 4/1997

(Continued)

OTHER PUBLICATIONS

European Search Report for Application No. 01402829, dated Nov. 27, 2003 (3 pages).

*Primary Examiner*—Peter DungBa Vo
*Assistant Examiner*—Arthur O. Hall
(74) *Attorney, Agent, or Firm*—Nixon Peabody LLP

(57) ABSTRACT

According to one aspect of the invention, a gaming machine for conducting a wagering game, comprising a physically configurable button panel and at least one mechanical button removably disposed in the button panel. The gaming machine also comprises an input panel disposed adjacent to the button to produce an output signal in response to a predetermined movement of the button and a controller for initiating a function in response to the output signal.

20 Claims, 8 Drawing Sheets

U.S. PATENT DOCUMENTS

| | | | | |
|---|---|---|---|---|
| 5,770,533 | A | 6/1998 | Franchi | 463/42 |
| 5,796,389 | A | 8/1998 | Bertram et al. | 345/173 |
| 5,833,537 | A | 11/1998 | Barrie | 463/21 |
| 5,951,397 | A | 9/1999 | Dickinson | 463/36 |
| 6,089,976 | A | 7/2000 | Schneider et al. | 463/16 |
| 6,102,394 | A | 8/2000 | Wurz et al. | |
| 6,117,010 | A | 9/2000 | Canterbury et al. | |
| 6,201,532 | B1 | 3/2001 | Tode et al. | |
| 6,204,839 | B1 * | 3/2001 | Mato, Jr. | 345/168 |
| 6,288,707 | B1 * | 9/2001 | Philipp | 345/168 |
| 6,368,213 | B1 | 4/2002 | McNabola | 463/18 |
| 6,369,803 | B2 * | 4/2002 | Brisebois et al. | 345/173 |
| 6,379,245 | B2 | 4/2002 | De Keller | 463/13 |
| 6,419,578 | B1 | 7/2002 | Moody et al. | 463/13 |
| 6,422,940 | B1 | 7/2002 | Walker et al. | 463/13 |
| 6,429,846 | B2 * | 8/2002 | Rosenberg et al. | 345/156 |
| 6,439,995 | B1 | 8/2002 | Hughs-Baird et al. | 463/20 |
| 6,454,649 | B1 | 9/2002 | Mattice et al. | |
| 6,636,203 | B1 * | 10/2003 | Wong et al. | 345/173 |
| 6,690,363 | B2 * | 2/2004 | Newton | 345/173 |
| 6,738,049 | B2 * | 5/2004 | Kiser et al. | 345/173 |
| 6,819,315 | B2 * | 11/2004 | Toepke et al. | 345/173 |
| 6,824,321 | B2 * | 11/2004 | Ward et al. | 400/479 |
| 6,876,354 | B1 * | 4/2005 | Terasaki et al. | 345/168 |
| 6,942,571 | B1 * | 9/2005 | McAllister et al. | 463/20 |
| 6,996,426 | B2 * | 2/2006 | Granberg | 455/575.4 |
| 7,067,754 | B2 * | 6/2006 | Weston et al. | 200/314 |
| 7,151,528 | B2 * | 12/2006 | Taylor et al. | 345/168 |
| 7,158,054 | B2 * | 1/2007 | Pihlaja | 341/22 |
| 7,277,081 | B2 * | 10/2007 | Ukita et al. | 345/156 |
| 7,312,791 | B2 * | 12/2007 | Hoshino et al. | 345/173 |
| 7,412,258 | B1 * | 8/2008 | Lipponen et al. | 455/556.1 |
| 7,432,911 | B2 * | 10/2008 | Skarine | 345/168 |
| 7,578,741 | B2 * | 8/2009 | Griswold et al. | 463/30 |
| 7,628,701 | B2 * | 12/2009 | Wells | 463/37 |
| 2002/0173354 | A1 | 11/2002 | Winans et al. | |
| 2003/0050117 | A1 * | 3/2003 | Silva et al. | 463/36 |
| 2003/0216173 | A1 | 11/2003 | Gauselmann | |
| 2003/0216174 | A1 | 11/2003 | Gauselmann | |
| 2004/0018877 | A1 | 1/2004 | Tastad et al. | |
| 2004/0038721 | A1 | 2/2004 | Wells | |
| 2004/0118669 | A1 | 6/2004 | Mou | |
| 2005/0059458 | A1 | 3/2005 | Griswold et al. | |
| 2005/0113163 | A1 | 5/2005 | Mattice et al. | |
| 2005/0230233 | A1 | 10/2005 | Hoehne et al. | |
| 2006/0166728 | A1 * | 7/2006 | Cornell et al. | 463/16 |
| 2006/0250377 | A1 * | 11/2006 | Zadesky et al. | 345/173 |

FOREIGN PATENT DOCUMENTS

| | | | |
|---|---|---|---|
| EP | 0 789 338 | | 8/1997 |
| EP | 0 886 250 | | 12/1998 |
| EP | 1 025 886 | | 8/2000 |
| EP | 1083531 | | 3/2001 |
| EP | 1187156 | A2 * | 3/2002 |
| GB | 2251112 | A | 6/1992 |
| WO | WO 97/27570 | | 7/1997 |
| WO | WO 98/00207 | | 1/1998 |

* cited by examiner

GAMING MACHINE WITH CONFIGURABLE BUTTON PANEL

CROSS-REFERENCE TO RELATED APPLICATION

This application claims the benefit of the U.S. Provisional Application 60/655,588, filed on Feb. 22,2005 and entitled "Gaming Machine With Configurable Button Panel", and this provisional application is hereby incorporated by reference in its entirety.

COPYRIGHT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a gaming machine with a configurable button panel.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, gaming machine manufacturers continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

Gaming machines have utilized a variety of mechanisms to present various combinations of symbols, and to award prizes, money, or other awards associated with certain predefined winning combinations. Traditional slot machines, for example, utilize a plurality of reels (either mechanical, or simulated on a video display) and at least one payline, with certain combination of symbols landing on the payline constituting winning combinations for which awards are given to the player in accordance with a pay table. Video poker gaming machines offer an alternative wherein winning combinations correspond with traditional winning poker hands.

Players of gaming machines have been presented with a variety of interface methods for entering commands into the gaming machine. Typical interface components are buttons, touch screen panels, and the traditional lever. Modern gaming machines are moving away from the lever and focusing more on button, touch screen, and other interface technologies. The convenience of these offerings helps speed up the play of the games and causes much less exertion to the player.

Buttons on gaming machines have evolved over the years, most notably changing in shape and lighting. While many varieties, lighting types, and purposes exist today, the focus of the buttons has always been primarily to initiate commands. While the advent of the button panel has increased the rate of play and made it easier for the player to conduct the game, the buttons themselves have only provided input to the gaming machine from the player and had very little to do with information feed back. With the ability to change games within a cabinet and alter signage and other artistic elements to support the new game, configuration of button panels typically relies on the ability of a technician to change the button identifier such as changing an insert or replace the entire button. As gaming machines start offering more game selections to the player, the need for instant re-configuration of elements such as buttons becomes necessary.

To increase the entertainment value of a gaming terminal and to support the specific configurations unique games, a configurable button panel would offer the gaming machine manufacturer additional latitude to help dynamically support unique themes on multi-game terminals and provide variety to the player without the limitation of a static button arrangement.

SUMMARY OF THE INVENTION

According to one aspect of the invention, a gaming machine for conducting a wagering game, comprising a physically configurable button panel and at least one mechanical button removably disposed in the button panel. The gaming machine also comprises an input panel disposed adjacent to the button to produce an output signal in response to a predetermined movement of the button and a controller for initiating a function in response to the output signal.

In another aspect of the present invention, a method of conducting a wagering game on a gaming machine is disclosed. The method comprises the act of providing a physically configurable button panel and at least one mechanical button removably disposed in the button panel. The method further comprises the act of providing an input panel disposed adjacent to the mechanical button to produce an output signal in response to a predetermined movement of the button, and the act of initiating a function with a controller in response to the output signal.

According to yet another aspect of the present invention, a physically configurable button panel for use with a gaming machine that conducts a wagering game is disclosed. The physically configurable button panel comprises at least one mechanical button and a configurable input panel for producing an output signal in response to actuation of the at least one mechanical button, the input panel being proximate to the button panel.

Additional aspects of the invention will be apparent to those of ordinary skill in the art in view of the detailed description of various embodiments, which is made with reference to the drawings, a brief description of which is provided below.

DETAILED DESCRIPTION

Figure 1:
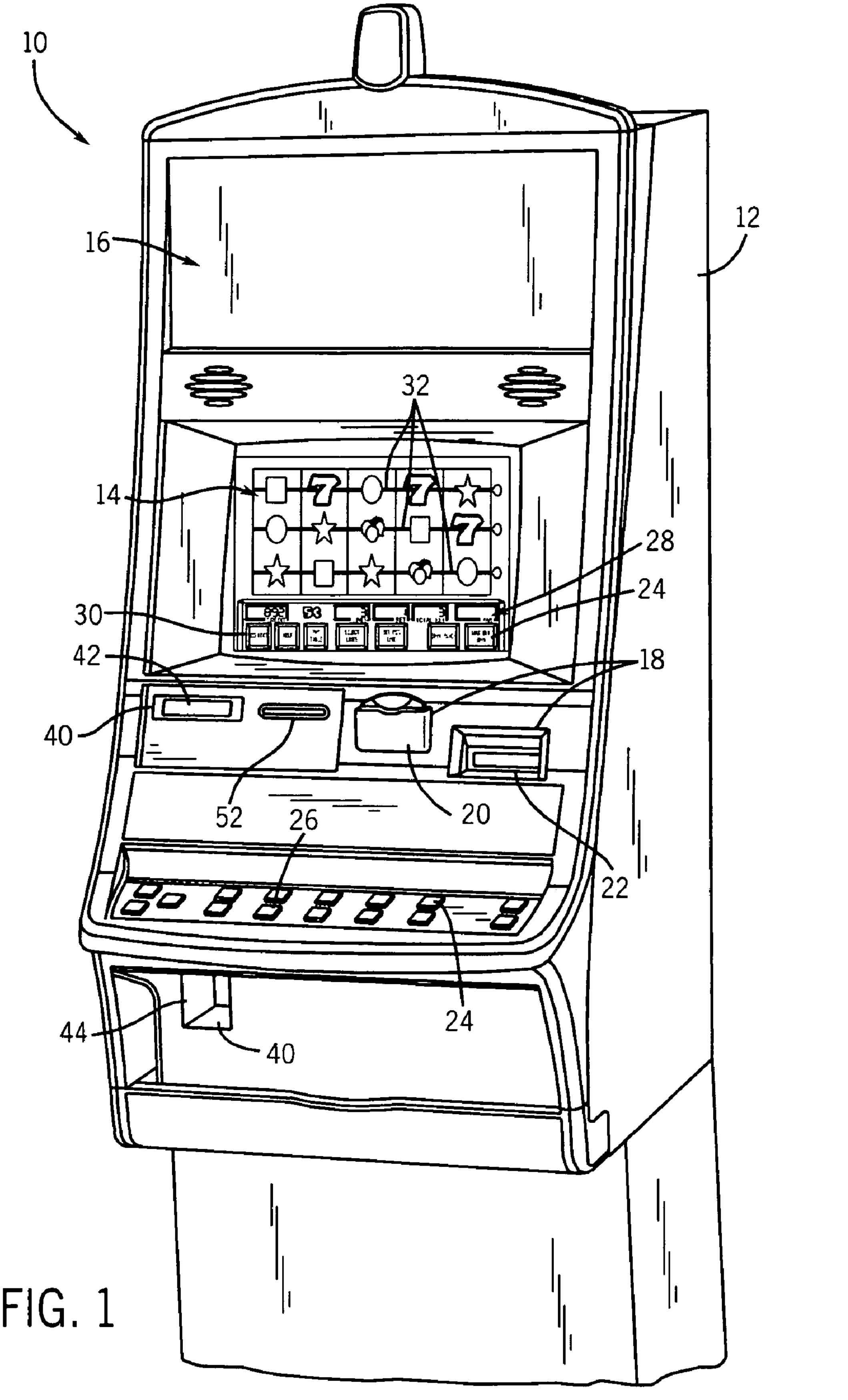
FIG. 1 is a perspective view of a gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an option on how to make their game selections. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire monitor (or a portion thereof to allow players to make game-related selections. Alternatively, the primary display 14 of the gaming machine 10 may include a number of mechanical devices to display certain aspects of the game or the outcome resulting from a wager. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a randomly mixed or shuffled set, array, stack, deck, or combination thereof of playing cards and any one or combination of a timer, placeholder, scoring meter, and other mechanisms used in play of the game. Outcomes are based on a combination of player skill and randomly generated presentations of playing cards.

In some embodiments, the gaming machine 10 may also include a player information reader 52 that allows for identification of a player by reading a card with information indicating his or her true identity. The player information reader 52 is shown in FIG. 1 as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 2:
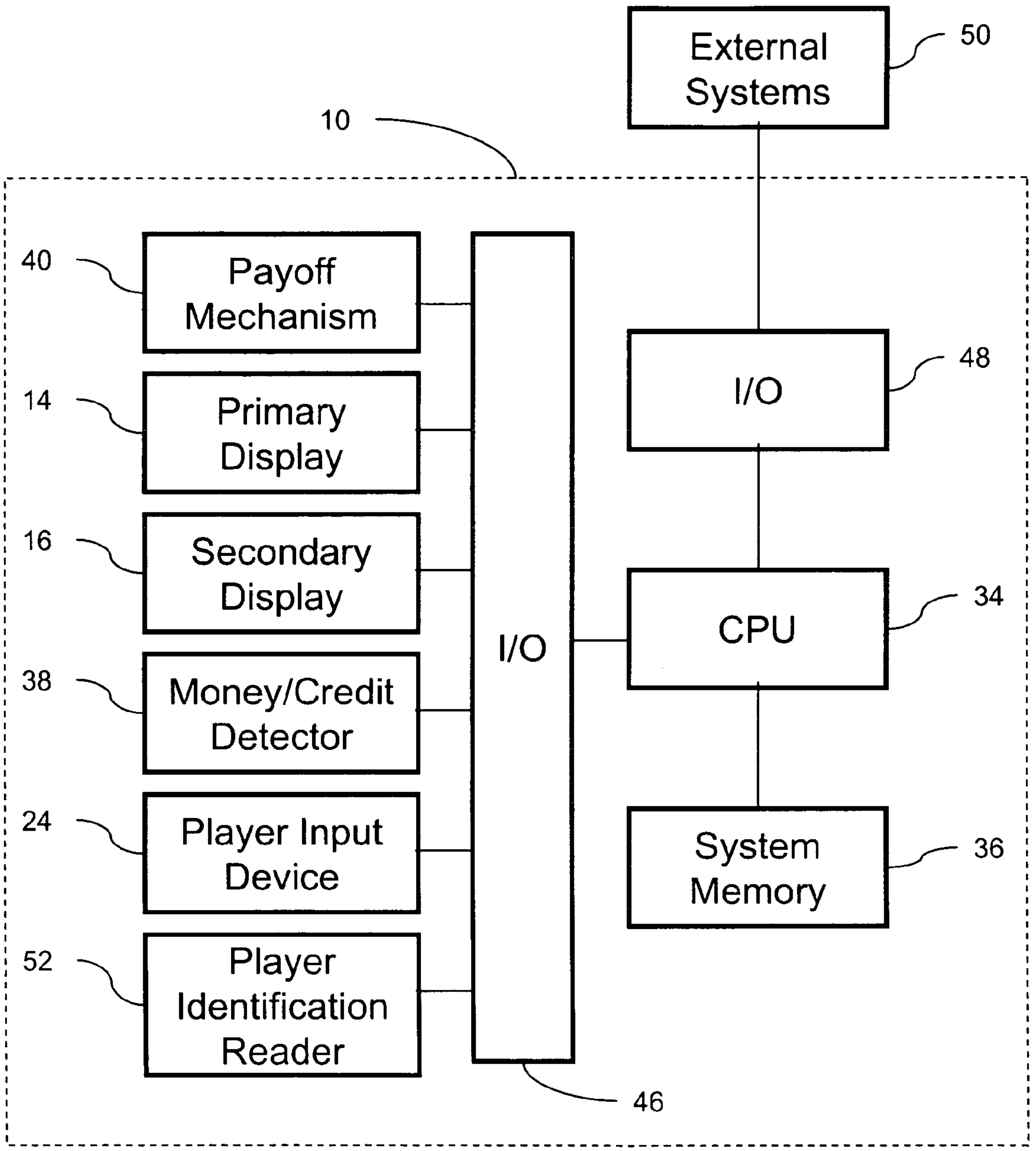
FIG. 2 is a block diagram of a control system suitable for operating the gaming machine.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprises a CPU in combination with such couple components as the I/O circuits 46, 48 and the system memory 36.

Figures 3A, 3B:
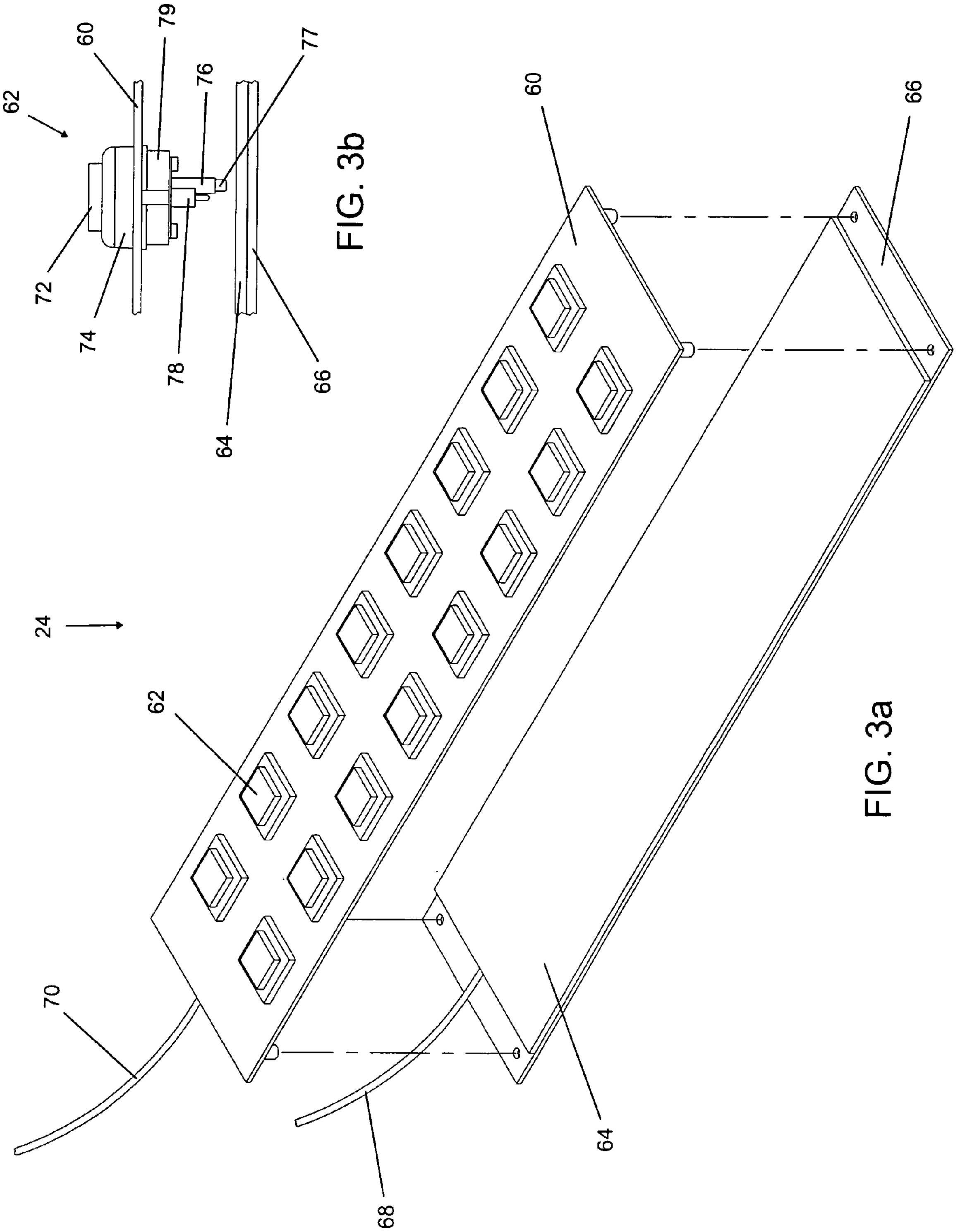
FIG. 3*a* is an exploded isometric view of a configurable mechanical-touch screen button panel in accordance with a first embodiment of the present invention.
FIG. 3*b* is a side view of a mechanical button used in the configurable mechanical-touch screen button panel in accordance with a first embodiment of the present invention.

In accordance with a first embodiment of the present invention, FIG. 3*a* is an exploded isometric view of a mechanical touch screen button panel used in this embodiment as a player input device 24. Button panel 60 contains multiple mechanical buttons 62 and is electrically connected to a power supply and controller via lighting cable 70. Lighting cable 70 provides power to the lighting elements used to illuminate the buttons 62. In some cases, lighting cable 70 also provides signaling from the primary controller to a secondary controller on or in close proximity to the button panel 60, said secondary controller controlling lighting effects on the button panel 60. Button panel 60 is connected to a support panel 66. The support panel 66 is also used to position a touch screen panel 64. The touch screen panel 64 is minimally flat on one surface and typically flat on two surfaces. The touch screen panel 64 receives power and receives and sends signals via a control cable 68. The touch screen panel 64 is positioned between the button panel 60 and the support panel 66. The touch screen panel 64 can be configured as a single switch with a single associated button 62, accommodating a single function. The touch screen panel 64 can also be configured as multiple switches with multiple buttons 62, accommodating multiple functions. The placement of the switches on the touch screen panel 64 is also configurable and may be done prior to the start of play or dynamically during play. The touch screen 64 is a sensor that typically has an electrical current or a signal passing through it. By touching the surface of the touch screen 64, a voltage or signal change occurs and is used to determine the location of the touch. Once determined, a signal is sent to a controller. The controller is configured to respond with specific functions based on the location of the touch on the touch screen 64. As explained above, these locations become, in essence, switches. Multiple switches can be configured on the touch screen 64 and an equal number of buttons can be arranged to correspond with each location or switch. Once assembled, button panel 60 is parallel to touch screen 64.

FIG. 3*b* is a side view of a button 62 on the button panel 60 in proximity to the touch screen 64. Indicia presented on a button cap 72 provides the player with information about the purpose and function of the button 62. Indicia presented on or through the button cap 72 can be of any of a number of forms including etching, screening, inserts, and liquid crystal display (LCD). Button cap 72 is inserted in bezel 74 that is connected to button panel 60 and button body 79. Various lighting methods and types can be used in this application. In this preferred embodiment, the buttons 62 are backlit or contain lighting elements such as a lamp 78 placed within the body 79 of the button 62. An actuator 76 is connected to button cap 72 through button body 79. The tip of actuator 76 is a stylus nib 77 comprised, but not limited to, a soft material such as rubber or nylon. The stylus nib 77 is the component of the mechanical button 62 that meets the surface of touch screen 64. To initiate a function, the player presses the button cap 72 on button 62. As the button cap 72 moves away from the player or downward, the actuator 76 and the stylus nib 77 moved down and touch the touch screen 64. The distance required for the actuator 76 to travel to reach the touch screen 64 can be any distance deemed necessary to cause the touch and achieve the result of altering the voltage or electrical signal at the point of contact on the touch screen 64 by the stylus nib 77. Additional aspects of the button 62 may include an internal mechanical device producing a "clicking" sound or tactile sensation. A primary advantage of this embodiment is the relatively quick reconfiguration of buttons to meet requirements of a new game offering or specific casino request. If, for example, the mechanical buttons 62 were configured with an LCD for displaying indicia and the mechanical buttons 62 received signaling through lighting cable 70, a new game offering could automatically reconfigure the button panel including the indicia presented on the mechanical buttons 62. As the new game is loaded, signals are sent to the button panel 60 configuring the buttons 62. Specific positions on the touch screen 64 would correspond to the intended use of the buttons 62. After the new game is loaded, signals received from specific positions on the touch screen 64 that correspond to the buttons 62 being pressed would initiate functions as determined by the game software.

Figure 4B:
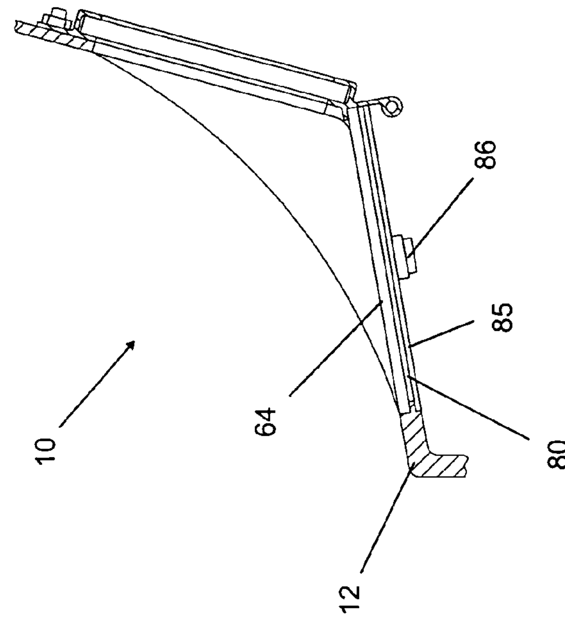
FIG. 4*b* is a side view of a configurable touch screen panel with a graphic button panel in accordance with a second embodiment of the present invention.
Figure 4A:
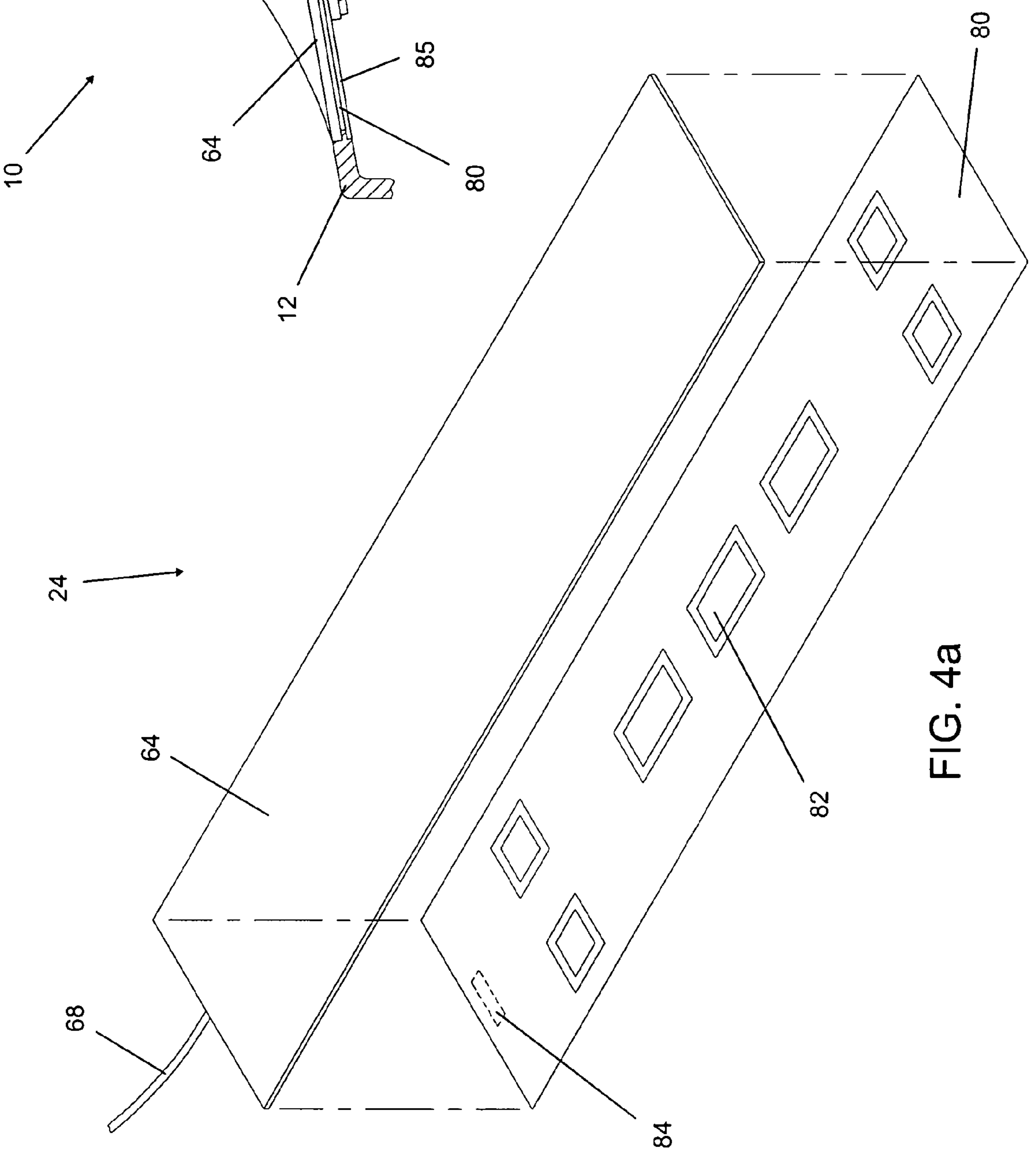
FIG. 4*a* is an exploded isometric view of a configurable touch screen panel with a graphic button panel in accordance with a second embodiment of the present invention.

In accordance with a second embodiment of the present invention, FIG. 4*a* is an exploded isometric view of a touch screen 64 with graphic button panel 80 containing an identification marking 84. The graphic button panel 80 is an artwork element that contains visual representations on buttons as shown by button representation 82. The graphic button panel 80 can be any visual artwork element including, but not limited to, translucent screened glass, translucent art film, paper, cardboard, plastic, and other sheet substances capable of presenting screening, printing, paint, etching, or other visual method of presenting artwork on a flat surface. An identification marking 84 is also presented on the graphic button panel 80. The identification marking 84 is a machine-readable identifier that identifies the graphic button panel 80 to the controller, thus allowing the controller to recognize the configuration of the touch screen 64 as visually presented to the player via graphic button panel 80 and respond accordingly to signals received from the touch screen 64 for the areas represented by the button representations 82. For example, a particular graphic button panel 80 is intended for a specific game. The identification marking 84 on the graphic button panel 80 identifies the specific game to the controller and the controller responds to the signals received from the areas on the touch screen 64 visually represented on the graphic button panel 80 by the button representations 82. The controller, in effect, configures the gaming machine to present the game and button panel based on the identification marking 84 on the graphic button panel 80. Identification marking 84 can be any visual marking including, but not limited to, bar coding, screen reflective surface, resistor, capacitor, or transistor screening, and physical binary encoding as represented by notches along the reading edge of the graphic button panel 80. The touch screen panel 64 is powered and communicates with the controller via a control cable 68. Backlighting may also be used to illuminate the graphic button panel 80.

FIG. 4*b* is a sectional view of an area on the gaming machine 10 that is a typical location for a player interface such as a button panel. In this embodiment, the touch screen 64 is the physical interface between the gaming machine 10 and the player. Graphic button panel 80 is positioned directly below the touch screen 64 and may be in close proximity or touching the bottom surface of touch screen 64. In this example, an identification reader 86 is mounted to a clear support panel 85 below the location of the identification marking 84 on the graphic button panel 80. The identification reader 86 is mounted to the bottom surface of clear support panel 85 or within a cutout on same said panel. The identification reader 86 can be any visual reading device including, but not limited to, a charge-coupled device (CCD), laser reader, infrared transceiver, and physical binary encoding reader. The identification reader 85 is connected to a controller responsible for responding to the signal sent by the identification reader 85.

Figure 5B:
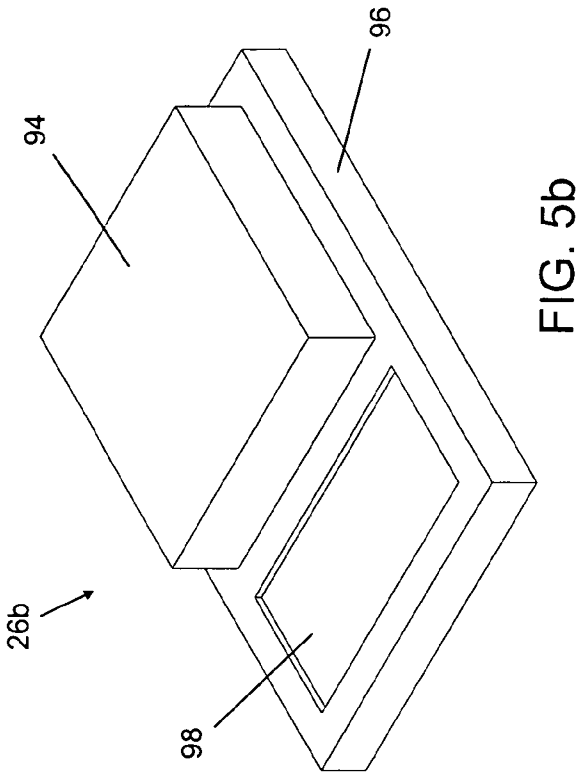
FIGS. 5*a*, 5*b*, and 5*c* are isometric views of configurable buttons in accordance with a third embodiment of the present invention.
Figure 5A:
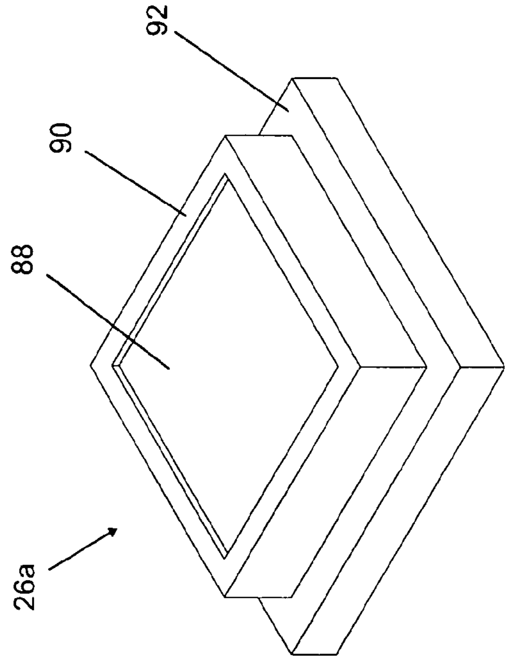
Figure 5C:
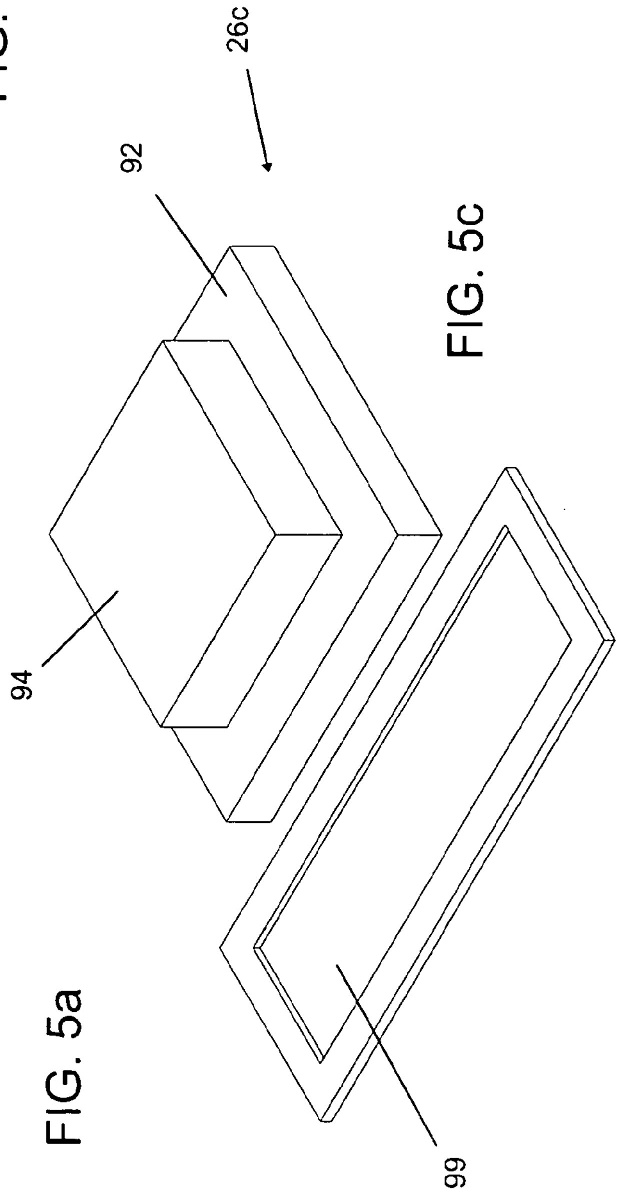

In accordance with a third embodiment of the present invention, FIGS. 5*a*, 5*b*, and 5*c* are isometric views of dynamically configurable buttons for a gaming machine. FIG. 5*a* is a button 26*a* with a liquid crystal display (LCD or light emitting diode (LED) display 88 mounted within the button body 90. FIG. 5*b* is a button 26*b* with an LCD or LED display 98 mounted in a bezel 96 surrounding the button body 94. FIG. 5*c* is a button 26*c* and LCD or LED display 99 configured in proximity to each other. Button 26*c* is comprised of bezel 92 and button body 94. In each of the examples comprising this embodiment, the actual function of the button 26 and corresponding label as displayed on the LCD or LED displays are directly configured by a controller internal to the gaming machine or externally from a host server. An excellent use of this embodiment is in a multiple-game gaming terminal. After a game has been selected, and during loading of the game to the display, the buttons on the button panel may also be configured to support the chosen game. As the game is being installed and configured, the buttons would automatically be configured to present the appropriate indicia to the player identifying the function of each button. Additionally, during play of a game, if bonus rounds require a different button configuration from the basic game, button function and the corresponding displays on the buttons can be dynamically changed.

Figure 6C:
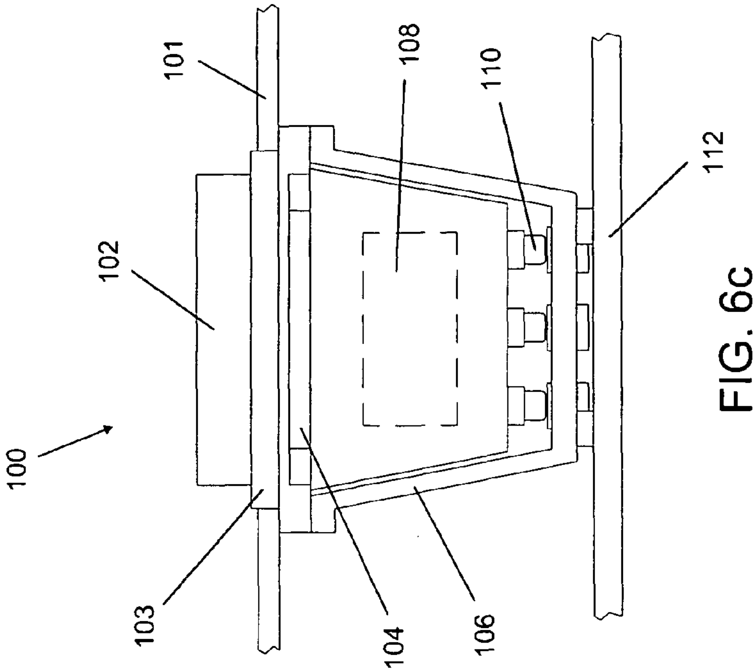
FIG. 6*c* is a sectional view of a button used in the physically configurable button panel of FIG. 6*a* in accordance with a third embodiment of the present invention.
Figure 6B:
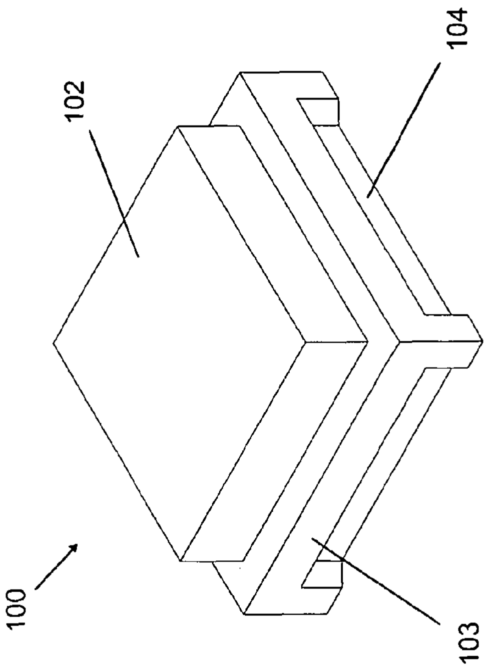
FIG. 6*b* is an isometric view of a button used in the physically configurable button panel of FIG. 6*a* in accordance with a third embodiment of the present invention.
Figure 6A:
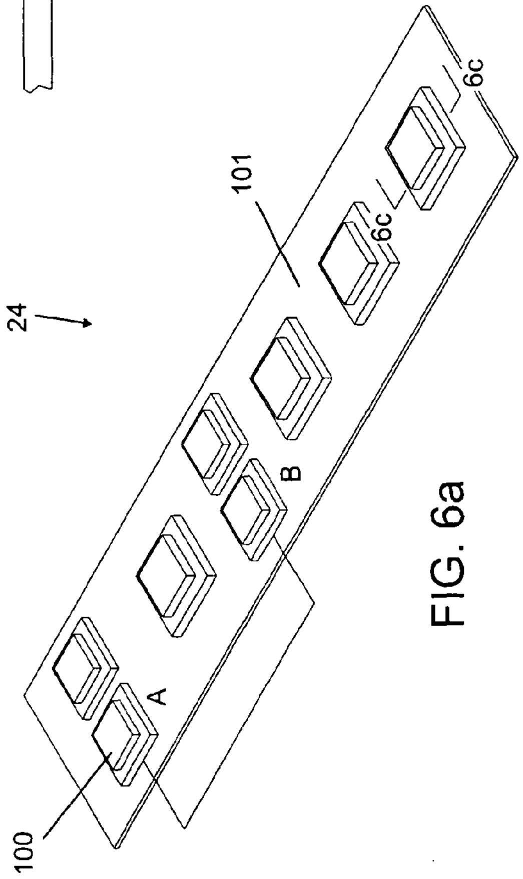
FIG. 6*a* is an isometric view of a physically configurable button panel in accordance with a third embodiment of the present invention.

In accordance with a fourth embodiment of the present invention, FIG. 6*a* is an isometric view of a player input device 24 in the form of a physically configurable button panel. Electro-mechanical buttons 100 are mounted within button panel 101. The buttons 100 can be physically interchanged between any positions on the button panel 101. In this example, button 100 in location A can physically change positions with button 100 in location B provided that the button 100 in position B is the same type of button 100 in position A. To prevent loss or theft, the button panel 101 secures the buttons 100 in place and is itself secured to the gaming machine. FIG. 6*b* is an isometric view of a button cap 102 and a button bezel 103 comprising the top portion of the button 100. Incorporated into the bezel 103 are finger grips 104 used to grasp the button 100 and remove it from its position. FIG. 6*c* is a sectional view of button 100 taken generally along line 6*c*-6*c* in FIG. 6*a*. Socket 106 is connected to printed circuit board 112 from which power is received and signaling is transmitted. Button 100 is comprised of button cap 102, bezel 103 with finger grips 104, body 105, identification chip 108, and contacts 110. Button 100 is placed into socket 106 and may be seated or secured within the socket 106 by a number of methods including compression, magnets, clasps, and others. To prevent unauthorized removal of the button 100, button panel 101 is positioned over the bezel 103 and secured to the gaming machine allowing the repositioning of the buttons 100 to be performed only by a technician or casino employee. Automatic recognition by the controller of the insertion of a button 100 is accomplished by the use of the identification chip 108. In this example, chip 108 is a memory device with a unique identification number such as the Dallas Semiconductor DS2401 Silicon Serial Number package. The controller is configured to recognize the function of the button 100 based on its identification as communicated by the identification chip 108. Since the identification chip 108 resides within the body 105 of the button 100, the function of the button 100 remains constant in any position on the button panel 101. Because of the permanence of the function of button 100, fixed indicia can be used when displaying the function of the button 100 to the player. Etching and screening are two methods that can be used to permanently print the function of the button 100 on the button cap 102. The flexibility of a physically configurable button panel allows casinos and other wagering establishments to create a button panel presentation that is unique or conforms to the general requirements of the patrons.

Figure 7:
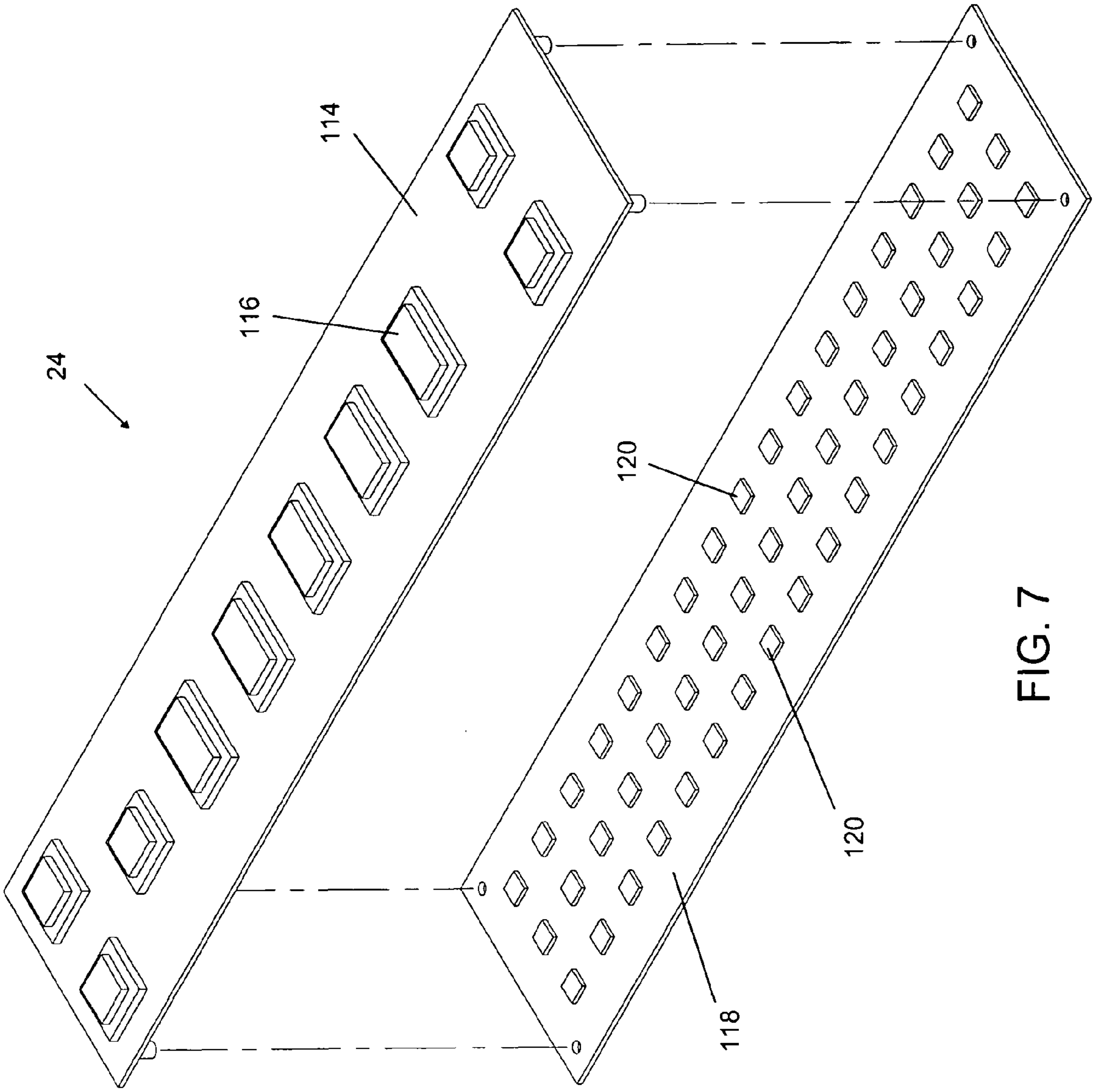
FIG. 7 is an exploded isometric view of a matrix button panel in accordance with a fourth embodiment of the present invention.
Figure 8A:
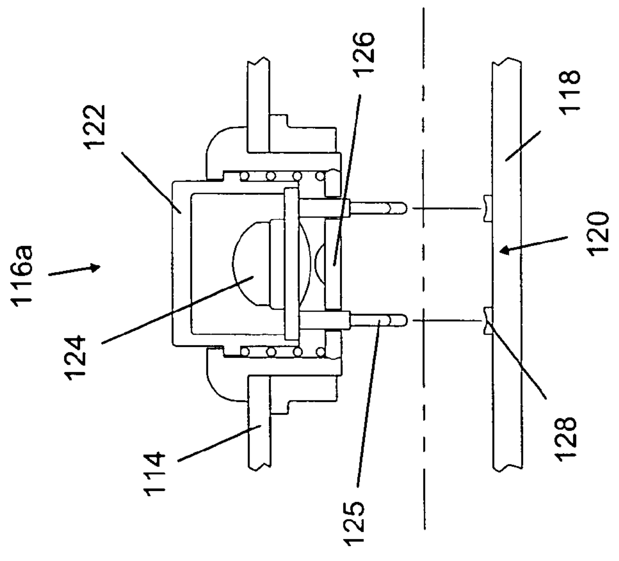
FIGS. 8*a*, 8*b*, and 8*c* are sectional views of buttons used in the matrix button panel of FIG. 7 in accordance with a fourth embodiment of the present invention.
Figure 8B:
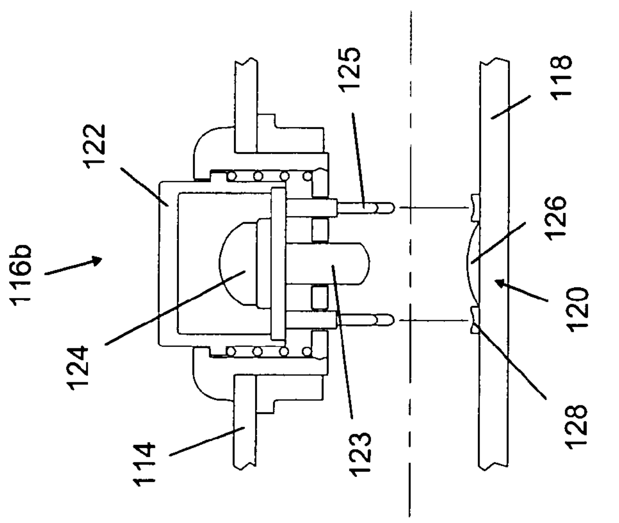
Figure 8C:
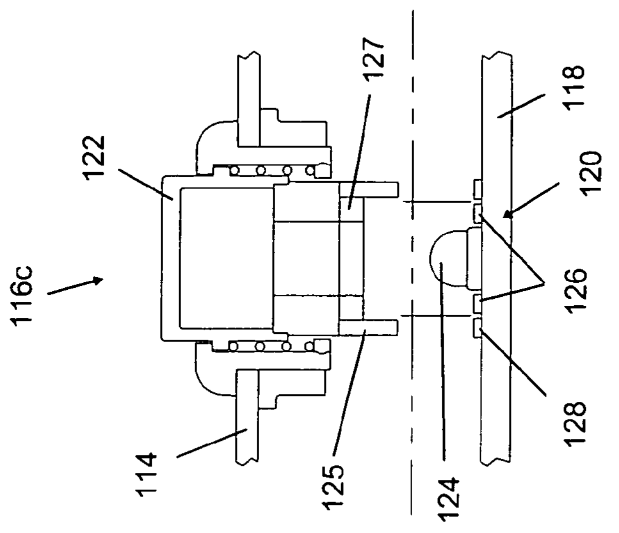

In accordance with a fifth embodiment of the present invention, FIG. 7 is an exploded isometric view of a player input device 24 in the form of a matrix button panel. The two primary components of the matrix button panel are a button panel 114 with buttons 116 and an internal component panel 118 with predefined component positions 120. The locations of the predefined component positions 120 allow the button panel 114 to be configured in a variety of ways with three rows of positions available. Once secured together the button panel 114 positions the buttons 116 over the predefined component positions 120. Continuing with FIG. 8*a* through FIG. 8*c*, sectional views of an exploded matrix button panel assembly, the variety of component placement combinations allow gaming machine designers the flexibility to create specific button designs while using a standard button panel. The flexibility allowed by the matrix button panel also includes the use of a variety of components configured a variety of ways allowing for more selective procurement to help lower component and assembly costs. Starting with FIG. 8*a*, the button panel 114 secures the button 116*a*. Under the button cap 122, a lamp assembly 124, for illuminating the button cap 122, and a switch assembly 126 are incorporated into the button 116*a*. On the internal component panel 118, the predefined component position 120 is only occupied by contacts 128 to connect electrical power and signal communications to the button 116*a*. When the button panel 114 and internal component panel 118 are connected, button leader 125 is inserted or physically touches contact 128 to create the electric and signal connection required to operate the button 116*a* and realize signaling form the button 116*a* to a controller. Turning now to FIG. 8*b*, button 116*b* includes the button cap 122 and internal lamp assembly 124. The switch 126 in this example, is now is located within the predefined component position 120 on the internal component panel 118. An actuator 123 compresses the switch 126 when the button cap 122 is pressed. As presented in the example shown in FIG. 8*a*, when the button panel 114 and internal component panel 118 are connected, button leader 125 is inserted or physically touches contact 128 to create the electric and signal connection required to operate the button 116*b*. FIG. 8*c* is another example of this embodiment showing most of the functional components placed in the predefined component position 120 on the internal component panel 118. Once the button panel 114 and internal component panel 118 are connected, button leader 125 is inserted or physically touches contact 128 to create the electric and signal connection required to operate button 116*c*. Switch contacts 126 are positioned around lamp assembly 124. When the button cap 122 is pressed, switch link 127 physically touched switch contacts 126 creating the circuit that identifies to the controller that switch 116*c* has been pressed. The three examples comprising this embodiment are presented to show the variety of configurations available to game designers and are intended to provide flexibility in design for component use and cost saings.

While the present invention has been described with reference to one or more particular embodiments, those skilled in the art will recognize that many changes may be made thereto without departing from the spirit and scope of the present invention.

Each of these embodiments and obvious variations thereof is contemplated as falling within the spirit and scope of the claimed invention, which is set forth in the following claims.

What is claimed is:

1. A gaming machine for conducting a wagering game, comprising:

a physically configurable button panel;

a mechanical button, comprising an assembly of components including an actuator, a button cap disposed in a substantially fixed relation to the actuator, a rigid button body being removably attached to the button panel, and a biasing element, the actuator and button cap being disposed to move together relative to the rigid button body and against a biasing force of the biasing element;

a touch screen input panel having a minimally flat surface comprising a touch screen configured to produce a change in a voltage signal or electrical signal responsive to a contact or near contact of the mechanical button actuator with a surface of the touch screen input panel, the touch screen input panel being disposed beneath and spaced apart from said button panel and said mechanical button, the touch screen input panel being configured to produce an output signal in response to a predetermined movement of the mechanical button actuator to a predetermined position on the touch screen input panel sufficient to change a voltage or electrical signal of said touch screen input panel at said position on the touch screen input panel; and a controller programmed to initiate a function associated with the wagering game in response to the output signal from the touch screen input panel.

2. The gaming machine of claim 1, wherein the touch screen input panel comprises a machine readable identification marking to identify the touch screen input panel to the controller.

3. The gaming machine of claim 2, further comprising:

a plurality of separate mechanical buttons, at least some of the separate mechanical buttons being individually removable from the button panel, wherein said touch screen input panel is disposed adjacent said plurality of mechanical buttons to produce an output signal in response to a predetermined movement of each of said plurality of mechanical buttons; and wherein the controller is configured to initiate at least one of a plurality of functions in response to each of said output signals.

4. The gaming machine of claim 1, wherein the button panel includes a plurality of mechanical buttons, the touch screen input panel producing respective output signals in response to actuation of the respective mechanical buttons, the controller initiating respective functions in response to the respective output signals.

5. The gaming machine of claim 1, wherein the mechanical button actuator is configured to contact said touch screen input panel upon said predetermined movement of said button.

6. The gaming machine of claim 1, wherein the mechanical button comprises a display disposed beneath the button cap, the display being movable together with the button cap and actuator relative to the rigid button body.

7. The gaming machine of claim 1, wherein the mechanical button includes a lamp.

8. The gaming machine of claim 1, wherein the touch screen input panel does not comprise a display.

9. The gaming machine of claim 1, wherein the at least one mechanical button is removably disposed in the button panel directly over the touch screen input panel.

10. A method of configuring a gaming machine, the method comprising:

incorporating a physically configurable button panel into the gaming machine, the physically configurable button panel including at least one mechanical button assembly removably disposed in the button panel, the mechanical button assembly comprising an actuator, a button cap disposed in a substantially fixed relation to the actuator, a rigid button body being removably attached to the button panel, and a biasing element, the actuator and button cap being disposed to move together relative to the rigid button body and against a biasing force of the biasing element;

disposing a touch screen input panel beneath and spaced apart from said mechanical button assembly and said button panel, the touch screen input panel having a minimally flat surface comprising a touch screen configured to produce a change in a voltage signal or electrical signal responsive to a contact or near contact of the mechanical button actuator with a surface of the touch screen input panel, so that the touch screen input panel produces an output signal in response to a predetermined movement of the actuator toward a predetermined position on the touch screen input panel; and configuring a controller in communication with the touch screen input panel to initiate a function relating to the wagering game, the function being initiated in response to the output signal from the touch screen input panel.

11. The method of claim 10, wherein the touch screen input panel comprises a machine readable identification marking to identify the touch screen input panel to the controller.

12. The method of claim 11, further comprising:

providing a plurality of mechanical button assemblies removably disposed in the button panel, disposing said touch screen input panel adjacent said plurality of mechanical button assemblies to produce an output signal in response to a predetermined movement of an actuator of each of said plurality of mechanical button assemblies toward respective predetermined positions on the touch screen input panel; and configuring said controller to initiate at least one of a plurality of functions in response to each of said output signals.

13. The method of claim 12, further comprising the act of removing at least one mechanical button assembly from said plurality of mechanical button assemblies and replacing said at least one mechanical button assembly with another mechanical button assembly.

14. The method of claim 10, further comprising the act of removing said at least one mechanical button assembly and replacing said at least one mechanical button assembly with another mechanical button assembly.

15. The method of claim 14, further comprising the act of providing an indicia indicative of a function at least one of on, within, and adjacent at least said another mechanical button assembly.

16. The method of claim 10, wherein the touch screen input panel does not comprise a display.

17. The method of claim 10, further comprising the act of providing an indicia indicative of a function at least one of on, within, and adjacent said mechanical button assembly.

18. The method of claim 10, further comprising the act of moving the at least one mechanical button assembly from a first location to a second location on the button panel, wherein the second location is a different location than the first location.

19. A physically configurable button panel for use with a gaming machine that conducts a wagering game, the physically configurable button panel comprising:

a mechanical button assembly removably disposed in the button panel, the mechanical button assembly comprising an assembly of components including an actuator, a button cap disposed in a substantially fixed relation to the actuator, a rigid button body being removably attached to the button panel, and a biasing element, the actuator and button cap being disposed to move together relative to the rigid button body and against a biasing force of the biasing element; and a touch screen input panel having a minimally flat surface comprising a touch screen configured to produce a change in a voltage signal or electrical signal responsive to a contact or near contact of the mechanical button actuator with a surface of the touch screen input panel, the touch screen input panel being disposed beneath and spaced apart from said button panel and said mechanical button, the touch screen input panel being configured to produce an output signal in response to movement of the mechanical button actuator toward a predetermined position on the touch screen input panel sufficient to change a voltage or electrical signal of said touch screen input panel at said position on the touch screen input panel, the touch screen input panel being proximate to the button panel.

20. The button panel of claim 19, wherein the touch screen input panel does not comprise a display and wherein the mechanical button comprises a display disposed beneath the button cap, the display being movable together with the button cap and actuator relative to the rigid button body.

* * * * *